United States Patent
Kowalczyk

(10) Patent No.: US 7,845,649 B2
(45) Date of Patent: Dec. 7, 2010

(54) METHODS AND APPARATUS TO FACILITATE SEALING HIGH PRESSURE JOINTS

(75) Inventor: Mark W. Kowalczyk, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 342 days.

(21) Appl. No.: 11/241,431

(22) Filed: Sep. 30, 2005

(65) Prior Publication Data

US 2008/0012323 A1    Jan. 17, 2008

(51) Int. Cl.
*F16J 15/02* (2006.01)
(52) U.S. Cl. .................. 277/641; 277/644; 277/647
(58) Field of Classification Search ........... 277/641, 277/644, 647
See application file for complete search history.

(56) References Cited

U.S. PATENT DOCUMENTS

| | | | | |
|---|---|---|---|---|
| 1,617,527 A | * | 2/1927 | Knight | 52/586.2 |
| 3,919,820 A | * | 11/1975 | Green | 52/396.04 |
| 3,994,609 A | * | 11/1976 | Puccio | 404/69 |
| 4,362,430 A | * | 12/1982 | Ceintrey | 404/68 |
| RE31,283 E | * | 6/1983 | Puccio | 404/68 |
| 4,488,324 A | * | 12/1984 | Hartkorn | 14/73.1 |
| 4,746,129 A | * | 5/1988 | Puccio | 277/641 |
| 5,104,286 A | * | 4/1992 | Donlan | 415/170.1 |
| 5,112,066 A | * | 5/1992 | Remmerfelt | 277/591 |
| 5,158,430 A | * | 10/1992 | Dixon et al. | 415/134 |
| 5,228,255 A | * | 7/1993 | Hahn | 52/396.04 |
| 5,269,624 A | * | 12/1993 | Kramer | 404/64 |
| 5,509,669 A | * | 4/1996 | Wolfe et al. | 277/654 |
| 5,624,227 A | * | 4/1997 | Farrell | 415/139 |
| 5,639,100 A | * | 6/1997 | Garrigues et al. | 277/614 |
| 5,657,998 A | * | 8/1997 | Dinc et al. | 277/653 |
| 6,652,231 B2 | * | 11/2003 | Vedantam et al. | 415/214.1 |
| 6,733,234 B2 | * | 5/2004 | Paprotna et al. | 415/138 |
| 6,857,639 B2 | * | 2/2005 | Beeck et al. | 277/637 |
| 6,926,284 B2 | * | 8/2005 | Hirst | 277/603 |
| 2004/0052637 A1 | | 3/2004 | Paprotna et al. | |

* cited by examiner

*Primary Examiner*—Alison K Pickard
(74) *Attorney, Agent, or Firm*—Armstrong Teasdale LLP

(57) ABSTRACT

A method and apparatus facilitates coupling a pressure vessel first mating surface to a second mating surface. The method comprises inserting a seal assembly into a groove defined in the first mating surfaces such that a portion of the seal assembly extends outwardly from the first mating surface, positioning the second mating surface in close proximity to the first mating surface such that the portion of the seal assembly extending outwardly from the first mating surface is received within a groove defined in the second mating surface, and such that the seal assembly facilitates reducing fluid leakage between the first and second mating surfaces.

18 Claims, 2 Drawing Sheets

METHODS AND APPARATUS TO FACILITATE SEALING HIGH PRESSURE JOINTS

BACKGROUND OF THE INVENTION

This application relates generally to bolted joints and, more particularly, to methods and apparatus for coupling high pressure bolted joints.

Within known power generation systems, leakage from a high pressure region through a bolted joint to a region of lower pressure may adversely affect the performance of the system. For example, the steam flow path in a steam turbine engine and the gas flow path in a gas flow turbine engine may be at a much higher pressure than a pressure of the surrounding ambient flow. Leakage of the steam and gas from the respective turbine engine to areas of lower pressure may be detrimental to the performance of either turbine engine.

To facilitate reducing leakage from high pressure regions to regions of lower pressure, flanges used with bolted connections are machined until the mating face of each flange is substantially smooth and flat. Moreover, each bolt used with such connections is then torqued such that the bolting force induced to each flange is substantially constant across the mating surface. However, because of the size and complexity of the components being coupled together, machining the flanges to the finish required to prevent leakage may be a difficult and time-consuming task. Moreover, depending on the application, fluids within areas of high pressure may still leak through such connections.

BRIEF SUMMARY OF THE INVENTION

In one aspect, a method for positioning a pressure vessel first mating surface adjacent to a second mating surface is provided. The method comprises inserting a seal assembly into a groove defined in the first mating surfaces such that a portion of the seal assembly extends outwardly from the first mating surface, positioning the second mating surface in close proximity to the first mating surface such that the portion of the seal assembly extending outwardly from the first mating surface is received within a groove defined in the second mating surface, and positioning the first mating surface adjacent to the second mating surface such that the seal assembly facilitates reducing fluid leakage between the first and second mating surfaces by creating a tortuous path against leakage.

In another aspect, a coupling system for use in pressure vessels is provided. The coupling system includes a first component, a second component, and a sealing assembly. The first component includes a mating surface and a groove defined within the mating surface. The second component includes a mating surface and a groove defined within the mating surface. The second component is positioned adjacent to the first component such that the first and second mating surfaces are substantially flush against each other. The sealing assembly is positioned at least partially within the first component mating surface groove and the second component mating surface groove and extends between the first and second components to facilitate reducing fluid leakage therebetween.

In a further aspect, a pressure vessel is provided. The pressure vessel includes a first mating surface, a second mating surface, and a sealing assembly. The first mating surface includes a groove defined therein. The second mating surface includes a groove defined therein. The second mating surface is positioned substantially flush against the first mating surface. The sealing assembly is positioned within the first and second mating surface grooves to facilitate reducing fluid leakage between the first and second mating surfaces.

DETAILED DESCRIPTION OF THE INVENTION

As used herein, the term "pressure vessel" may include any vessel, container, component, or portion thereof, that is designed to contain a pressurized fluid that is at a pressure above that of atmospheric pressure. For example, pressure vessels may include, but are not limited to, turbine casings, turbine shells, steam separators, vavle casings, pipe joints, and/or pipe flanges. The aforementioned examples are intended as exemplary only, and thus are not intended to limit in any way the definition and/or meaning of the terms "pressure vessel". In addition, as used herein the term "component" may include any object that has been, or may be, manufactured.

Figure 1:
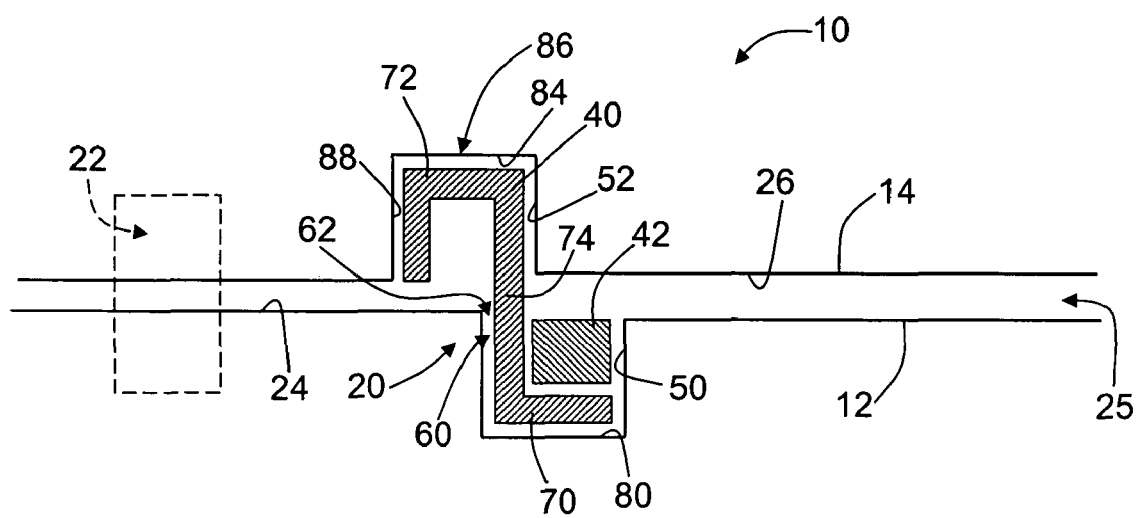
FIG. 1 is schematic illustration of an exemplary coupling system for use with pressurized fluids.
Figure 2:
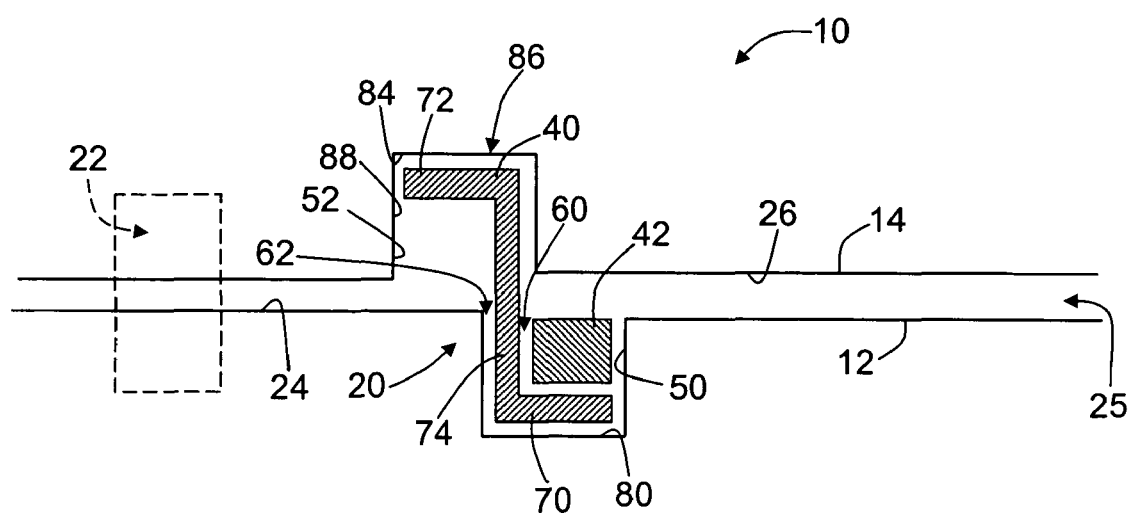
FIG. 2 is an alternative embodiment of the coupling system shown in FIG. 1.
Figure 3:
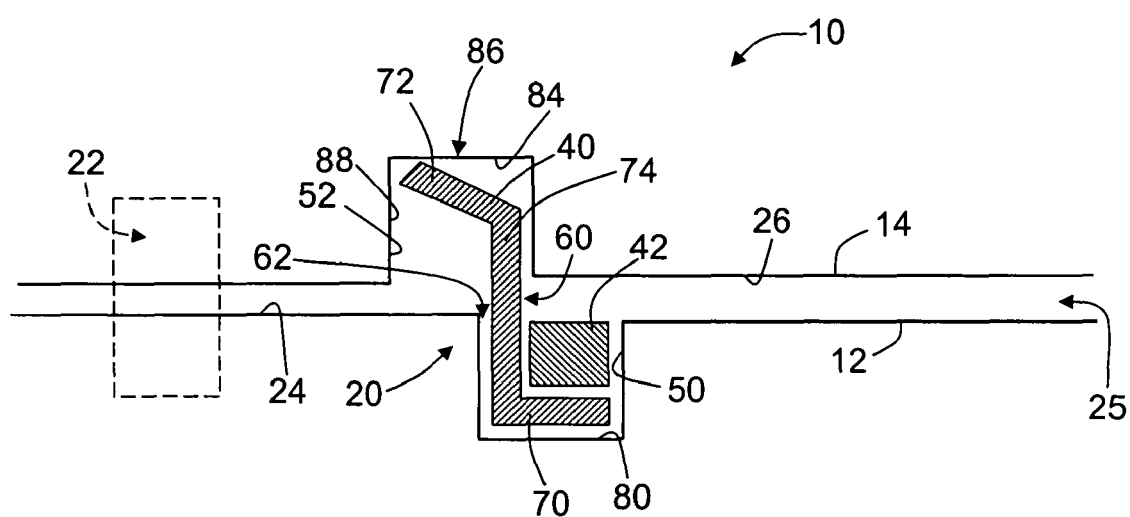
FIG. 3 is a further alternative embodiment of the coupling system shown in FIG. 1.

FIG. 1 is schematic illustration of an exemplary coupling system 10 for use with pressure vessels and pressurized fluids. FIG. 2 is an alternative embodiment of coupling system 10. FIG. 3 is an further alternative embodiment of coupling system 10. In each embodiment, and as described in more detail below, coupling system 10 facilitates coupling a flanged first component 12 to a flanged second component 14 within a pressure vessel. More specifically, in each exemplary embodiment, the pressure contained by second component 14 is higher than the pressure contained by first component 12. As such, and as illustrated, in each embodiment, the pressure on the left side of each figure is greater than the pressure on the right side of each figure. Moreover, the pressure may increase as components 12 and 14 are coupled together.

In each embodiment, coupling system 10 includes a seal assembly 20 and a plurality of fasteners 22. Fasteners 22, as described in more detail below, facilitate mechanically coupling first component 12 to second component 14 such that a flange mating surface 24 of first component 12 is substantially flush along a joint line 25 against a flange mating surface 26 of second component 14. In the exemplary embodiment, fasteners 22 are threaded nut and bolt assemblies. Alternatively, any fasteners 22 may be any fastener which facilitate coupling first component 12 to second component 14 as described herein, such as, but not limited to, rivets, or screws.

In each embodiment, first component 12 and second component 14 include a sealing groove 50 and 52, respectively, defined therein. More specifically, each groove 50 and 52 extends generally radially inward from each respective mating surface 24 and 26. In one embodiment, groove 50 and/or 52 substantially circumscribes a respective component 12 or 14. In an alternative embodiment, a series of grooves 50 and/or 52 are oriented to substantially circumscribe component 12 or 14, respectively.

In each embodiment, grooves 50 and 52 are oriented such that when components 12 and 14 are coupled together via fasteners 22, grooves 50 and 52 are concentrically offset from one another. More specifically, grooves 50 and 52 are oriented such that only a portion 60 of groove 50 overlaps a portion 62 of groove 52 when components 12 and 14 are coupled together. It should be noted that although grooves 50 are illustrated as being substantially straight in cross-section, grooves 50 may have any cross-sectional shape and can be formed in round or curved component sections to accommodate pipe and casing profiles, for example.

Seal assembly 20 includes a seal member 40 and a seal filler 42. In the exemplary embodiment, seal filler 42 is a caulking wire sealing strip. Alternatively, seal filler 42 may be any seal sealing strip that enables filler 42 to function as described herein. Seal member 40 includes a first end 70, a second end 72, and a body 74 extending therebetween. Seal member 40 provides a sealing advantage over known sealing components by creating a torturous flow path which facilitates minimizing fluid flow between components 12 and 14.

In each embodiment, when first component 12 is coupled to second component 14, seal member first end 70 is positioned within first component groove 50, seal member second end 72 is positioned within second component groove 52, and seal body 74 extends between grooves 50 and 52. More specifically, when components 12 and 14 are coupled together, seal member body 74 extends substantially perpendicularly between component groove portions 60 and 62, with respect to mating surface 24 and joint line 25. Moreover, in each embodiment, seal member first end 70 is sized and shaped to extend outwardly from seal member body 74 along a bottom surface 80 of groove 50. More specifically, when components 12 and 14 are coupled together, seal member first end is pressed substantially flush against groove bottom surface 80 in sealing contact.

In each embodiment, after seal member first end 70 is positioned within groove 50, seal filler 42 is positioned within groove 50 to facilitate securing seal member 70 within groove 50. Accordingly, in each exemplary embodiment, seal member first end 70 is positioned between seal filler 42 and groove bottom surface 80.

Seal member second end 72 is positioned within groove 52. Seal member second end 72 is compliant such that when components 12 and 14 are coupled together, second end 72 is positioned in contact against a portion of a wall 86 defining groove 52 such that seal member second end 72 provides sufficient leakage interference within groove 52, as explained in more detail below. More specifically, and for example, in one embodiment, seal member second end 72 is positioned substantially flush against a bottom surface 84 of groove 52, as is shown in FIG. 2. In another exemplary embodiment, seal member second end 72 is L-shaped and is positioned against groove bottom surface 84 and a side wall 88 defining groove 52, as is shown in FIG. 1. In a further embodiment, seal member second end 72 is a knife edge that extends obliquely from seal member body 74 to contact groove bottom surface 84, as is shown in FIG. 3. In another embodiment, a plating or coating, such as, but not limited to, a copper material or a nickel material, is applied within a portion of groove 52 or 50 to facilitate seating of seal member second end 72 within groove surface 84. In one embodiment, seal member 40 is fabricated from a material having a higher differential thermal expansion coefficient than components 12 and/or 14 such that seal member 40 expands more than components 12 and/or 14 when system 10 is heated.

In each embodiment, when component 12 is coupled to component 14, the seal/groove interference formed between seal assembly 20 and grooves 50 and 52 creates a labyrinth-type seal that defines a tortuous path for leakage between components 12 and 14. More specifically, when components 12 and 14 are coupled together, seal assembly 20 extends across joint line 25 and bridges the gap between components 12 and 14. Thus, when a positive pressure is applied to components 12 and 14, seal assembly 20 facilitates creating a leakage barrier as seal filler 42 is pressed against seal member 40. The pressure induced against seal member 40 by seal filler 42 facilitates forcing seal member 40 into sealing contact with groove surface 80.

Moreover, as seal filler 42 is deformed against seal member 40 within groove 50, the deformation of seal filler 42 facilitates seal assembly 20 effectively reducing fluid leakage through joint line 25 and thus forces fluid leakage entering joint line 25 to attempt to travel through the tortuous fluid path defined by seal member 40 and more particularly, defined by seal member second end 72 and wall 86. In an alternative embodiment, coupling assembly 10 does not include grooves 50 and 52, but rather relies on a tongue and groove type arrangement with seal assembly 20.

The above-described coupling assemblies provide a cost-effective and reliable method for facilitating reducing leakage through bolted couplings exposed to high pressure. More specifically, the coupling assemblies include a seal assembly that extends across a joint line, formed between the two coupled components, and into grooves formed within each component. As such, when a positive pressure is induced to the coupling assembly, the seal assembly forms an interference fit with the grooves such that a labyrinth-type seal having a tortuous path for leakage is formed. Accordingly, flange sections of each component can be machined more easily without any complex features. As a result, the coupling assembly facilitates reducing leakage through bolted joints in a cost-effective and reliable manner.

Exemplary embodiments of bolted joints and coupling assemblies are described above in detail. The coupling assemblies are not limited to the specific embodiments described herein, but rather, components of each coupling assembly may be utilized independently and separately from other components described herein. For example, each seal assembly component can also be used in combination with other seal assemblies and other coupling assemblies, and is not limited to practice with only components 12 and 14 as described herein. Rather, the present invention can be implemented and utilized in connection with many other joint configurations. Moreover, the present invention can be stacked depending on the application.

While the invention has been described in terms of various specific embodiments, those skilled in the art will recognize that the invention can be practiced with modification within the spirit and scope of the claims.

What is claimed is:

1. A method for positioning a pressure vessel first mating surface adjacent to a second mating surface, said method comprising:

inserting a seal assembly into a groove defined in the first mating surface, wherein the seal assembly includes a seal member having a body that extends between a first end and a second end, wherein the first end extends substantially perpendicularly from the body in a first direction and along a surface of the first mating surface groove, the body extends outwardly from the first mating surface, the second end extends obliquely outwardly from the body in a second direction;

positioning the second mating surface in close proximity to the first mating surface such that the body extending outwardly from the first mating surface is received within a groove defined in the second mating surface, wherein the second mating surface groove includes a side wall and a bottom surface that is adjacent to the side wall and that is oriented such that a pressure induced by at least one of the first mating surface and the second mating surface against the seal assembly positions the seal assembly against the bottom surface to facilitate reducing fluid leakage between the first and second mating surfaces; and positioning a seal filler into the first mating surface groove such that the seal filler is positioned between the second mating surface and the seal member first end, wherein the seal member first end extends between the seal filler and the first mating surface groove bottom surface that extends between a pair of opposed sidewalls defining the first mating surface groove.

2. A method in accordance with claim 1 wherein positioning a seal filler into the first mating surface groove further comprises:

inserting the seal filler into the first mating surface groove such that the seal filler facilitates maintaining the seal member within the groove and facilitates reducing leakage between the first and second components.

3. A method in accordance with claim 2 wherein inserting a seal assembly into the first mating surface groove further comprises:

inserting the first end of the seal member into the first mating surface groove; and inserting the second end of the seal member into the second mating surface groove.

4. A method in accordance with claim 1 wherein inserting a seal assembly into the first mating surface groove further comprises inserting the seal member into the first mating surface groove such that a portion of the seal member extends substantially perpendicularly outward from the groove.

5. A method in accordance with claim 1 wherein positioning the second mating surface in close proximity to the first mating surface further comprises positioning the second mating surface relative to the first mating surface such that the groove defined in the second mating surface is offset with respect to the groove defined in the first mating surface.

6. A coupling system for use with a pressurized system, said coupling system comprising:

a first component comprising a mating surface and a groove defined within said mating surface;

a second component comprising a mating surface and a groove defined within said mating surface, said second component positioned adjacent to said first component such that said first and second mating surfaces are substantially flush against each other;

a sealing assembly positioned at least partially within said first component mating surface groove and said second component mating surface groove, said sealing assembly comprises a seal member comprising a body that extends between a first end and a second end, said first end extending substantially perpendicularly from said body in a first direction and along a surface of said first component mating surface groove, said second end extending obliquely outwardly from said body in a second direction, wherein said body extends between said first and second components, said second component mating surface groove comprises a side wall and a bottom surface adjacent to said side wall and oriented such that a pressure induced by at least one of said first component mating surface and said second component mating surface against said sealing assembly positions said sealing assembly against said bottom surface to facilitate reducing fluid leakage between said first component mating surface and said second component mating surface; and a seal filler positioned within said first mating surface groove between said second mating surface and said seal member first end, such that said seal member first end is positioned between said seal filler and said first component mating surface groove bottom surface that extends between a pair of opposed sidewalls that define said first mating surface groove.

7. A coupling system in accordance with claim 6 wherein said seal member is in contact with said seal filler.

8. A coupling system in accordance with claim 7 wherein said seal filler is configured to secure said seal member within one of said first component mating surface groove and said second component mating surface groove.

9. A coupling system in accordance with claim 7 wherein each of said first component mating surface groove and said second component mating surface groove is sized to receive said seal member and said seal filler therein.

10. A coupling system in accordance with claim 7 wherein said seal filler is configured to deform against said seal member when said first component is positioned adjacent to said second component.

11. A coupling system in accordance with claim 7 wherein said seal member comprises a pair of end portions and a body portion extending therebetween, at least a portion of said body portion is aligned substantially perpendicularly to at least one of said first component mating surface and said second component mating surface when said sealing assembly is positioned between said first and second components.

12. A coupling system in accordance with claim 6 wherein said first component mating surface groove is offset from said second component mating surface groove when said first component is coupled to said second component.

13. A pressure vessel comprising:

a first mating surface comprising a groove defined therein;

a second mating surface comprising a groove defined therein, said second mating surface groove comprises a side wall and a bottom surface adjacent to said side wall, said second mating surface coupled substantially flush against said first mating surface by a plurality of fasteners; and a sealing assembly positioned within said first and second mating surface grooves such that a pressure induced by at least one of said first mating surface and said second mating surface against said sealing assembly positions said sealing assembly against said bottom surface to facilitate reducing fluid leakage between said first and second mating surfaces, said sealing assembly comprises a sealing member comprising a body extending between a first end and a second end, said first end extending substantially perpendicularly from said body in a first direction and along a surface of said first mating surface groove, said second end extending obliquely outwardly from said body in a second direction, wherein said body extends between said first and second mating surfaces, and a sealing filler positioned within said first mating surface groove between said second mating surface and said sealing member first end, said sealing member first end is positioned between said sealing filler and said first mating surface groove bottom surface that extends between a pair of opposed sidewalls that define the first mating surface groove.

14. A pressure vessel in accordance with claim 13 wherein said sealing filler configured to retain said sealing member within at least one of said first mating surface groove and said second mating surface groove.

15. A pressure vessel in accordance with claim 14 wherein at least one of said first mating surface groove and said second mating surface groove is sized to receive said sealing filler and a portion of said sealing member therein.

16. A pressure vessel in accordance with claim 14 wherein at least a portion of said sealing member is oriented substantially perpendicularly to said first mating surface and said second mating surface.

17. A pressure vessel in accordance with claim 14 wherein a first portion of said sealing member contacts a bottom surface of said first mating surface groove and a second portion of said sealing member contacts said bottom surface of said second mating surface groove when said first mating surface is coupled to said second mating surface.

18. A pressure vessel in accordance with claim 14 wherein said first mating surface groove is offset from said second mating surface groove when said first mating surface is coupled against said second mating surface.

* * * * *